R. F. ROGERS.
REMOVABLE SEAT STRUCTURE.
APPLICATION FILED JAN. 13, 1913.
1,103,315.
Patented July 14, 1914.
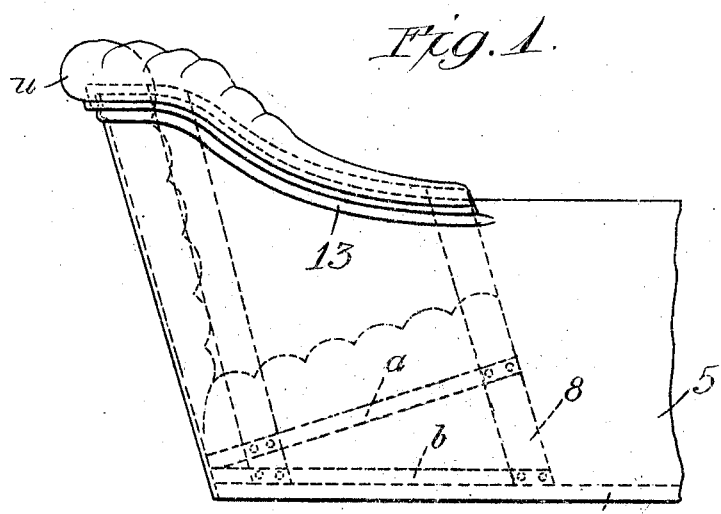
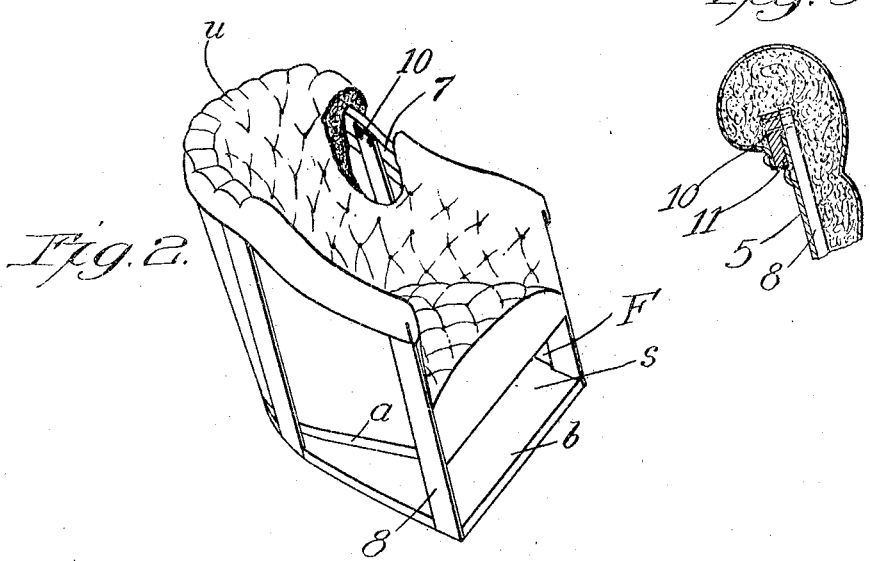
Witnesses:
Harry S. Gaither
S. M. Ryan
Inventor,
Ralph F. Rogers
by Offield, Towle, Graves & Offield,
Attys

UNITED STATES PATENT OFFICE.

RALPH F. ROGERS, OF CHICAGO, ILLINOIS.

REMOVABLE SEAT STRUCTURE.

1,103,315.

Specification of Letters Patent. Patented July 14, 1914.

Application filed January 13, 1913. Serial No. 741,802.

*To all whom it may concern:*

Be it known that I, RALPH F. ROGERS, a citizen of the United States, and resident of Chicago, in the county of Cook and State of Illinois, have invented certain new and useful Improvements in Removable Seat Structures, of which the following is a specification.

My invention relates to improvements in removable seat structures, particularly seat structures for motor driven vehicles.

In the construction of motor vehicles, particularly automobiles and motor-cycle attachments, the body is usually constructed of sheet metal. Such body is usually painted, lacquered, or otherwise finished before the seat structures are finally arranged therein and the upholstering applied. During such completion and finish of the seat structures the finish on the body is very apt to become scratched or otherwise marred. Furthermore, where the seat structures are thus permanently built in, a body cannot very well be used for commercial purposes as the upholstering would quickly be ruined under such conditions of use.

One of the main objects of my invention is therefore to provide such form of body structure that the seat structures and the entire upholstering may be in the nature of attachments which can be readily and quickly applied when the vehicle is to be used for passenger purposes and which can be quickly removed when the vehicle is to be used for commercial purposes.

Another object of the invention is to provide improved construction and arrangement for the removable seat structures, each seat structure comprising preferably a skeletonized supporting frame on which all the upholstering is arranged and secured and which skeletonized supporting frame is adapted to be slipped into place in the vehicle body to be then securely held in place without the aid of any bolts, screws or other fastening mechanisms and without in anywise marring or injuring the finish on the vehicle body.

In the accompanying drawings which illustrate the various features of the invention Figure 1 is a side elevational view of a vehicle body showing the seat structure in place thereon; Fig. 2 is a perspective view of a removable seat structure; and Fig. 3 is an enlarged sectional view showing the manner in which the seat structure is supported on the vehicle body.

In the drawings I have shown the features of the invention in connection with the seat structure particularly adaptable for application to bodies attached to motor-cycles, it being evident, however, that the seat structures could be equally adaptable and useful in connection with other vehicles.

In the drawings 5 represents the body structure which is usually formed of sheet metal. The frame F for the removable seat structure is of more or less skeleton form and as shown comprises the base 6, the top rail 7, vertical side bars 8 and a seat floor 9. The side bars 8 are secured in a suitable manner to the base and the top rail and to the seat floor. As shown, the top rail is secured to the side bars by bolts 10. To enable the seat structure frame to be readily applied to or disconnected from a vehicle body, the arrangement and connection of the top rail with reference to the side bars is such that after fastening of the top rail a slot 11 will be left between each side bar and the lower part of the top rail. This could be accomplished by inserting washers or spacers between the side bars and the upper end of the top rail, or a rabbeted top rail could be used, such as is shown in the drawing. The upholstering $u$ is applied in the usual manner to the seat floor and between the side bars and about the top rail, the upholstering, however, terminating at or above the lower end of the top rail so as not to interfere with the slots 11. These slots 11 are provided to receive the upper edge of the sheet metal body. This top edge is shaped and bent to conform with the top rail of the seat structure so that the seat structure can be slipped into the body to receive the upper edge of the body in the slots 11, the seat structure being then securely and rigidly held to the body. The weight of the seat structure could all be taken up by the floor 12 of the vehicle body, or all of the seat structure weight could be supported from the top of the sheet metal body, that is, the seat structure could be hung from the body edge. In order to prevent cutting of the top rail by the engaging edge of the vehicle body, and also to form a more neat and finished appearance, a bead 13 may be formed in the body to receive the lower edge of the top rail. This bead will also serve to stiffen the sheet metal body when the seat structure is removed and will tend to prevent bending of the upper edge of the body so that it will always be sufficiently straight to readily engage in the slots 11 and in the rabbet of the top rail.

I thus provide a removable seat structure which is of simple but durable construction and which can be quickly slipped into the vehicle body when a passenger is to be carried and which can be readily withdrawn from the body when the vehicle is to be used for commercial transportation purposes. The space $s$ between base $b$ and the seat floor $a$ forms a storage compartment for tools or other material when the seat structure is in the body. By providing a detachable preformed complete seat structure, the vehicle body can be more readily finished and such finish need not in any way be injured by subsequent application thereto of seat structure parts or upholstering. The removable seat structure has all the upholstering permanently applied thereto and the structure can be applied or removed without in any wise injuring the body finish.

I do not limit myself to the exact construction and arrangement of parts shown and described as changes may be made therein without departing from the spirit of the invention.

I claim the following:

In a removable seat structure for vehicle bodies, a supporting frame comprising a base and a top rail and connecting side bars, said top rail being spaced from the side bars to leave grooves for receiving the top edge of a vehicle body, a seat floor raised from the base to leave a compartment between the base and floor, and upholstering applied to the seat floor and to said side bars and top rail.

In witness whereof, I hereunto subscribe my name this 11th day of January, A. D., 1913.

RALPH F. ROGERS.

Witnesses:
SADIE M. RYAN,
JAMES R. OFFIELD.